US006710318B2

(12) United States Patent
Lin

(10) Patent No.: US 6,710,318 B2
(45) Date of Patent: Mar. 23, 2004

(54) BRIGHTNESS FEEDBACK DISPLAY DEVICE

(75) Inventor: Chiang Hung Lin, Taipei (TW)

(73) Assignee: Kinpo Electronics, Inc., Taipei (TW)

( * ) Notice: Subject to any disclaimer, the term of this patent is extended or adjusted under 35 U.S.C. 154(b) by 0 days.

(21) Appl. No.: 10/184,122

(22) Filed: Jun. 28, 2002

(65) Prior Publication Data

US 2004/0000628 A1 Jan. 1, 2004

(51) Int. Cl.$^7$ ................................................ G01J 1/32
(52) U.S. Cl. .................................... 250/205; 250/214 R
(58) Field of Search ............................ 250/205, 208.1, 250/214 R, 214 D, 214 AL, 214 B, 214 DC; 345/7–12, 48, 50, 84, 87

(56) References Cited

U.S. PATENT DOCUMENTS 6,483,245 B1 * 11/2002 Weindorf et al. ............. 315/82

* cited by examiner

*Primary Examiner*—Que T. Le
(74) *Attorney, Agent, or Firm*—Browdy and Neimark

(57) ABSTRACT

A brightness feedback display device includes a LCD panel, a plurality of first photo-sensors for sensing the environmental brightness variation of the display device itself. Corresponding sensing signals are delivered to first converters for being converted to first digital reference signals that are delivered to a microprocessor, thereby determining how much brightness of the display panel increases or decreases. Via a light-guiding element and a second photo-sensor installed within the display panel, the light brightness from the display panel is sensed and converted to a second digital reference signal that is compared with the first digital reference signals to determine whether the display brightness is at an optimal value.

11 Claims, 3 Drawing Sheets

BRIGHTNESS FEEDBACK DISPLAY DEVICE

BACKGROUND OF THE INVENTION

1. Field of the Invention

The invention relates to a display device. More particularly, the invention provides a display device that can automatically adjust the display brightness via a disposition of photo-sensors so as to achieve the function of feedback brightness.

2. Description of the Related Art

A liquid crystal display (LCD) panel provides a planar display that is widely used in portable electronic equipments such as portable computers, personal digital assistants (PDA) and recently developed web pads. The principal advantage of the LCD panel lies in a substantial reduction of its size and weight and, furthermore, since the LCD panel has no electron accelerator therewithin, the screen thickness are therefore considerably reduced in comparison with traditional CRT display devices.

Although the numerous advantages described above, LCD panels also have some inconveniences. Well known downsides hence include an inferior image quality, including, for example, the inferior display contrast and narrower angle of view. Regarding some aspects, a LCD device therefore still does not provide the same quality comparing with CRT counterparts. More particularly, the worst scenario for the inferiority of the display contrast of the LCD device is if the LCD device is operated in somewhere with relatively high brightness. As a result, the display quality therefore greatly relies upon the brightness of the environment. Although some LCD devices are provided with the automatic adjustment of light brightness and contrast, these types of adjustments known in the prior arts are however in accordance with the displayed frame and further require a compulsory activation from the user. Therefore, in order to obtain an optimal display, the user usually has to adjust the display parameters of the LCD display device. When the brightness of the environment increases, the display contrast or brightness has to be adjusted accordingly. The same rule is applicable to the situation while the brightness of the environment lowers. For users, the above mentioned adjustments always lead to some inconveniences.

SUMMARY OF THE INVENTION

It is therefore a principal object of the invention to provide a brightness feedback display device that can automatically adjust the display brightness of the display device according to the variation of the environment brightness of the display device.

It is another object of the invention to provide a brightness feedback display device that can provide an optimal display brightness that matches with the environment conditions by means of a feedback brightness sensing.

Furthermore, it is another object of the invention to provide a brightness feedback display device that can prevent excessive display brightness or darkness of the display device with respect to the brightness of the environment, thereby reducing the power consumption and protecting the user's eyes.

To accomplish the above and other objectives, a brightness feedback display device comprises a display panel, a plurality of first photo-sensors, a plurality of first converters, a light-guiding element, a feedback sensing unit and a microprocessor. The first photo-sensors respectively sense environmental brightness variations of the display device, and respectively output corresponding sensing signals. The first converters are respectively connected to the first photo-sensors and convert the respective sensing signals to a plurality of corresponding first digital reference signals. The light-guiding element receives and transmits the light emitted from the display panel. The feedback sensing unit further includes a second photo-sensor and a second converter. The second photo-sensor senses the light variation from the light-guiding element, and then the second converter converts the sensed light variation to generate a second digital reference signal. The microprocessor controls the brightness of the display panel according to the variation of the first and second digital reference signals.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
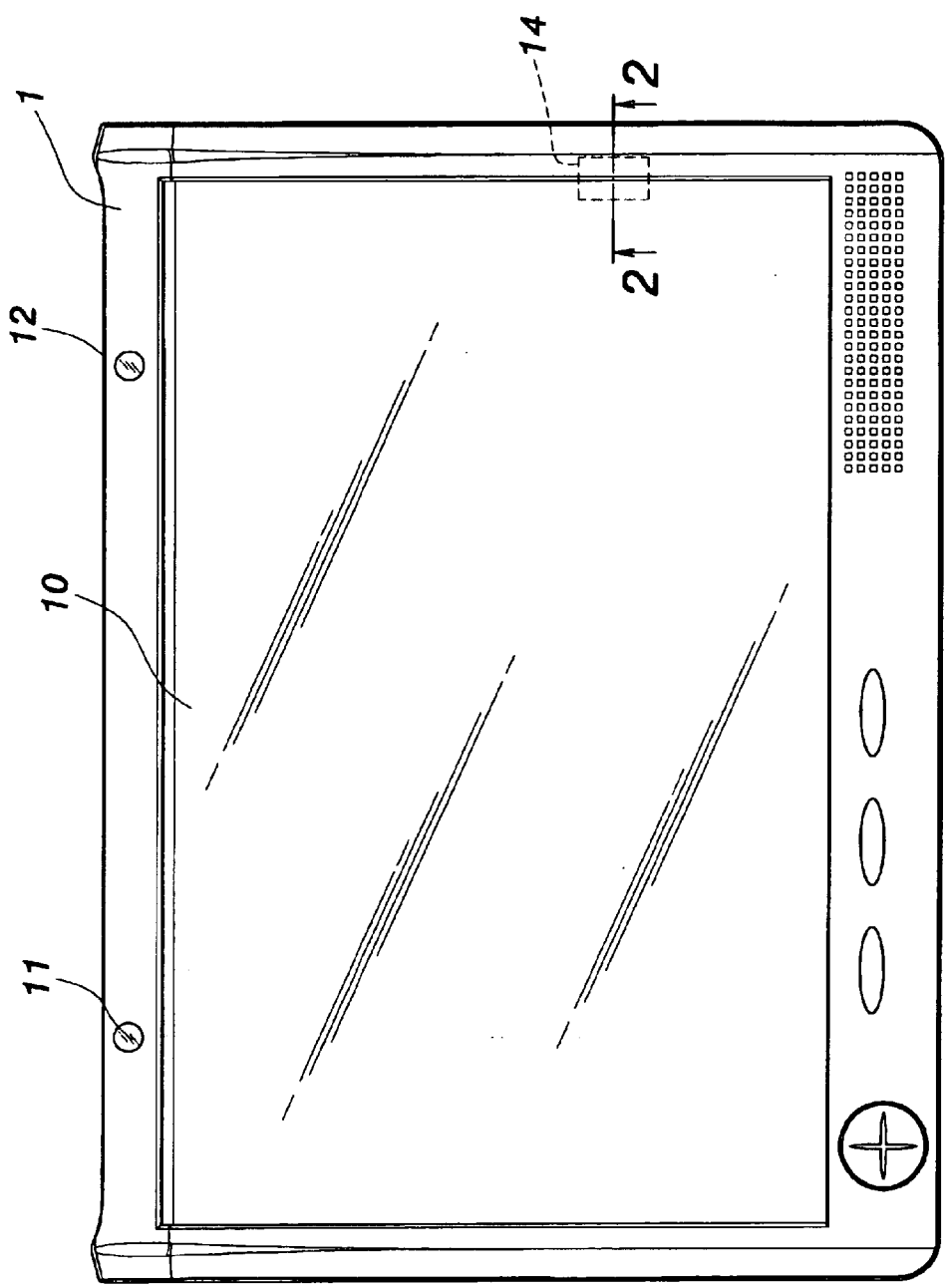
FIG. 1 is an outer view of an embodiment of the invention.

Wherever possible in the following description, like reference numerals will refer to like elements and parts unless otherwise illustrated.

Figure 2:
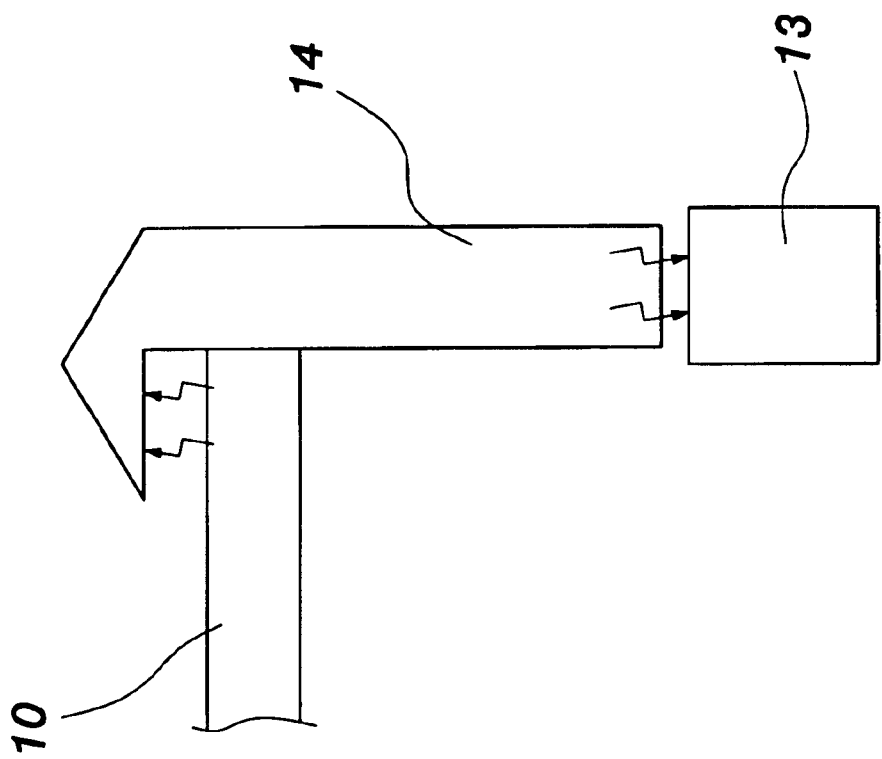
FIG. 2 is a cross-sectional view of FIG. 1 along the line 2—2.

FIG. 1 and FIG. 2 are respectively an outer view and a locally enlarged view of a first embodiment of the invention. As illustrated, a brightness feedback display device 1, preferably a web pad, includes a display panel 10. The display panel 10 is typically a LCD panel. The display device 1 further includes a control circuit (illustrated with more details in FIG. 3) therewithin that is electrically connected to the display panel 10 to control the brightness of the display panel 10. Proximate to two regions of a front face of the display panel 10 is arranged a groove (not shown) to enable the placement of first photo-sensors 11, 12. The first photo-sensors 11 are placed at an adequate location with respect to the user and the display device 1. The first photo-sensors 11, 12, electrically connected to the control circuit, are photo-sensitive resistors whose resistances vary according to the environmental brightness variation. Surrounding brightness can be thereby sensed. At one side of a light-emitting source of the display panel 10 is disposed a light-guiding element 14. One side of the light-guiding element 14 is further mounted into the display panel 10 for the purpose of receiving and transmitting the light from the light-emitting source. The light-guiding element 14 is principally a light-guiding column used to receive and transmit the light emitted from the light-emitting source of the display panel 10. Furthermore, a transparent body (not shown) may additionally cover the first photo-sensors 11, 12 for protection.

Figure 3:
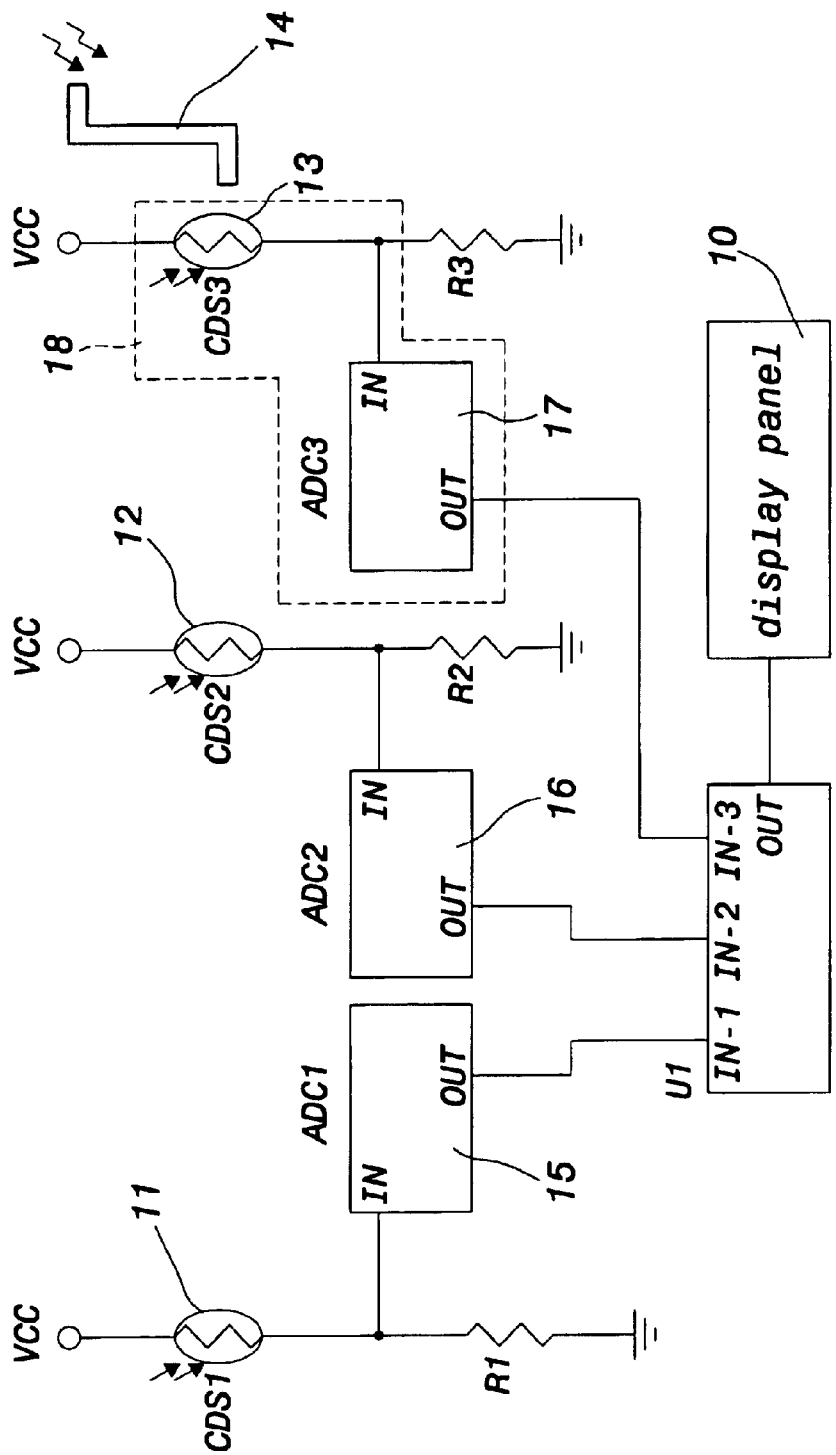
FIG. 3 is a circuit diagram of an internal circuitry of an embodiment of the invention.

Referring to FIG. 3, a circuit diagram schematically illustrates an internal circuitry of the first embodiment of the invention. As illustrated, the internal circuitry of the invention includes photo-sensitive resistors CDS1~CDS3, resistors R1~R3, analog/digital (A/D) converters ADC1~ADC3, and microprocessor U1. The first photo-sensors 11, 12 are respectively the photo-sensitive resistors CDS1, CDS2, and the CDS1 has one terminal electrically connected to a constant voltage source Vcc and another terminal electrically connected to the ground via the resistor RI and an input of the A/D converter ADC1, respectively. A terminal of the photo-sensitive resistor CDS2 is electrically connected to the constant voltage source Vcc and another terminal is electrically connected to the ground via the resistor R2 and an input of the A/D converter ADC2. The photo-sensitive resistor CDS3 is a second photo-sensor 13 installed within the display panel 10 and proximate to the light-guiding element 14 (as shown in FIG. 2). A terminal of the photo-sensitive resistor CDS3 is electrically connected to the constant voltage source Vcc and another terminal is electrically connected to the ground via the resistor R3 and an input of the A/D converter ADC3. The respective outputs of the A/D converters ADC1~ADC3 are electrically connected to the microprocessor U1 that has a terminal electrically connected to the display panel 10. The A/D converter ADC1, ADC2 are respectively designated to the first converters 15, 16, and the A/D converter ADC3 is designated to the second converter 17. The second photo-sensor 13 and the second converter 17 both are included in a feedback sensing unit 18. The light emitted from the light-emitting source of the display panel 10 passes through the light-guiding element 14 to be directly transmitted to the second photo-sensor 13.

The first photo-sensors 11, 12 sense the environmental brightness Variation of the display panel 10 and output corresponding sensing signals. When the environmental brightness of the display panel 10 increases, the respective resistance of the first photo-sensors 11, 12 decreases and the voltages of the sensing signals delivered to the first converters 15, 16 accordingly increase. The first converter 15, 16 convert the sensing signals to corresponding first digital reference signals that are delivered to the microprocessor U1. The microprocessor U1 compares the first digital reference signals with a preset value initially stored in the microprocessor U1 to determine how much brightness will increase. Accordingly, the brightness of the inner lamps of the display panel 10 progressively increases. Meanwhile, the resistance of the second photo-sensor 13 decreases. The corresponding voltage delivered to the second converter 17 accordingly increases and is converted to a second digital reference signal delivered to the microprocessor U1. According to the variation of the first and second digital reference signals, the microprocessor U1 accordingly controls the brightness of the light emitted from the display panel 10 and, through the control of the feedback sensing unit 18, achieves a certain brightness standard to protect the user's eyes.

When the environmental brightness of the display panel 10 decreases, the respective resistance of the first photo-sensors 11, 12 accordingly increases, which reduces the voltages delivered to the first converters 15, 16. The first converters 15, 16 convert the respective sensing signals to corresponding first digital reference signals that are delivered to the microprocessor U1. The microprocessor U1 compares the first digital reference signals with a preset value initially stored in the microprocessor U1 to determine the how much brightness will increase. Accordingly, the brightness of the inner lamps of the display panel 10 progressively decreases. And meanwhile, the resistance of the second photo-sensor 13 increases. The corresponding voltage delivered to the second converter 17 accordingly decreases and is converted to a second digital reference signal delivered to the microprocessor U1. According to the variation of the first and second digital reference signals, the microprocessor U1 accordingly controls the brightness of the light emitted from the light-emitting source of the display panel 10 and, through the control of the feedback sensing unit 18, achieves a certain brightness standard to reduce the power consumption.

The light brightness from the display panel 10 can be therefore adjusted in accordance with the environmental brightness of the display panel 10 to achieve an optimal power consumption of the display device and a protection of the user's eyes.

Furthermore, if the user chooses a manual adjustment of the light brightness of the display panel 10, this function can be provided by the an application program preset in the display system, the microprocessor U1 then does not consider the signals delivered from the first and second converters 15, 16, 17 and only takes into account the values manually inputted by the user.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A brightness feedback display device, comprising:
   a display panel;
   a plurality of first photo-sensors for sensing the environmental brightness variation of the display panel and outputting a plurality of corresponding sensing signals;
   a plurality of first converters, respectively connected to the first photo-sensors and converting the respective sensing signals to a plurality of corresponding first digital reference signals;
   a light-guiding element for receiving and transmitting a light emitted from the display panel;
   a feedback sensing unit having a second photo-sensor and a second converter, the second photo-sensor sensing a light variation of the light-guiding element, and then the second converter converting the sensed light variation of the light-guiding element so as to generate a second digital reference signal; and
   a microprocessor for controlling the brightness of the display panel according to the variation of the first and the second digital reference signals.

2. The device of claim 1, wherein the display panel is installed within a web pad.

3. The device of claim 1, wherein the display panel is a liquid crystal display (LCD) panel.

4. The device of claim 1, wherein the first photo-sensors are photo-sensitive resistors.

5. The device of claim 1, wherein the first photo-sensors are installed at two ends on a front face of the display panel.

6. The device of claim 1, wherein the first converters are analog/digital (A/D) converters.

7. The device of claim 1, wherein the light-guiding element has one side mounted into the display panel for directly receiving and transmitting the light emitted from a light-emitting source within the display panel.

8. The device of claim 7, wherein the light-guiding element is a light-guiding column.

9. The device of claim 1, wherein the second photo-sensor is a photo-sensitive resistor.

10. The device of claim 1, wherein the second photo-sensor is installed within the display panel and proximate to the light-guiding element.

11. The device of claim 1, wherein the second converter is an A/D converter.

* * * * *